(12) United States Patent
Xing et al.

(10) Patent No.: US 10,014,531 B2
(45) Date of Patent: Jul. 3, 2018

(54) FUEL CELL SYSTEM CONFIGURED TO CAPTURE CHROMIUM

(71) Applicant: LG Fuel Cell Systems, Inc., North Canton, OH (US)

(72) Inventors: Zhengliang Xing, North Canton, OH (US); Zhien Liu, Canton, OH (US); Richard W. Goettler, Medina, OH (US)

(73) Assignee: LG FUEL CELL SYSTEMS, INC., North Canton, OH (US)

( * ) Notice: Subject to any disclaimer, the term of this patent is extended or adjusted under 35 U.S.C. 154(b) by 64 days.

(21) Appl. No.: 14/212,153

(22) Filed: Mar. 14, 2014

(65) Prior Publication Data

US 2014/0272622 A1    Sep. 18, 2014

Related U.S. Application Data

(60) Provisional application No. 61/799,914, filed on Mar. 15, 2013.

(51) Int. Cl.

| | |
|---|---|
| *H01M 4/90* | (2006.01) |
| *H01M 8/1213* | (2016.01) |
| *H01M 8/0243* | (2016.01) |
| *H01M 8/0236* | (2016.01) |
| *H01M 8/124* | (2016.01) |
| *H01M 8/1286* | (2016.01) |

(52) U.S. Cl.
CPC ....... *H01M 4/9033* (2013.01); *H01M 8/0243* (2013.01); *H01M 8/1213* (2013.01); *H01M 8/0236* (2013.01); *H01M 8/1286* (2013.01); H01M 2008/1293 (2013.01)

(58) Field of Classification Search
CPC ............. H01M 4/9033; H01M 8/0243; H01M 8/1213; H01M 8/0236; H01M 8/1286
See application file for complete search history.

(56) References Cited

U.S. PATENT DOCUMENTS

| | | | |
|---|---|---|---|
| 4,663,250 A | 5/1987 | Ong et al. | |
| 4,888,254 A | 12/1989 | Reichner | |

(Continued)

FOREIGN PATENT DOCUMENTS

| | | |
|---|---|---|
| CN | 101519740 | 9/2009 |
| CN | 101795782 | 8/2010 |

(Continued)

OTHER PUBLICATIONS

Hendriksen et al., "Development and Durability of SOFC Stacks," RISØ National Laboratory Public Report, Jan. 12, 2004, 31 pp.

(Continued)

*Primary Examiner* — Oi K Conley
(74) *Attorney, Agent, or Firm* — Dentons US LLP

(57) ABSTRACT

In some examples, a fuel cell comprising a cathode, a cathode conductor layer adjacent the cathode, an electrolyte separated from the cathode conductor layer by the cathode, and an anode separated from the cathode by the electrolyte, wherein the anode, cathode conductor layer, cathode, and electrolyte are configured to form an electrochemical cell, and wherein at least one of cathode or the cathode conductor layer includes an exsolute oxide configured to capture Cr vapor species present in the fuel cell system.

14 Claims, 5 Drawing Sheets

(56) References Cited

U.S. PATENT DOCUMENTS

| | | | |
|---|---|---|---|
| 5,175,061 A | 12/1992 | Hildebrandt et al. | |
| 5,273,837 A | 12/1993 | Aitken et al. | |
| 5,549,983 A | 8/1996 | Yamanis | |
| 5,928,805 A | 7/1999 | Singh et al. | |
| 5,942,349 A | 8/1999 | Badwal et al. | |
| 6,291,089 B1 | 9/2001 | Piascik et al. | |
| 6,344,426 B1 | 2/2002 | Hata et al. | |
| 6,558,832 B1 | 5/2003 | Bruck et al. | |
| 6,623,881 B2 | 9/2003 | Badding et al. | |
| 6,638,658 B1 | 10/2003 | McLean | |
| 6,852,436 B2 | 2/2005 | Badding et al. | |
| 6,949,307 B2 | 9/2005 | Cable et al. | |
| 7,001,684 B2 | 2/2006 | Doshi et al. | |
| 7,285,350 B2 | 10/2007 | Keefer et al. | |
| 7,323,266 B2 | 1/2008 | Morishima et al. | |
| 7,351,449 B2 | 4/2008 | Hunt et al. | |
| 7,378,173 B2 | 5/2008 | Badding et al. | |
| 7,378,174 B2 | 5/2008 | Hart et al. | |
| 7,381,492 B2 | 6/2008 | Chen et al. | |
| 7,510,819 B2 | 3/2009 | Chen et al. | |
| 7,531,260 B2 | 5/2009 | Day et al. | |
| 7,572,532 B2 | 8/2009 | Stevens et al. | |
| 7,632,587 B2 | 12/2009 | McLean et al. | |
| 7,709,124 B2 | 5/2010 | Barnett et al. | |
| 7,718,113 B2 | 5/2010 | Crumm et al. | |
| 7,732,002 B2 | 6/2010 | Kodas et al. | |
| 7,781,109 B2 | 8/2010 | Gross | |
| 7,842,434 B2 | 11/2010 | Rakowski et al. | |
| 8,455,154 B2 | 6/2013 | Kwon et al. | |
| 8,637,209 B2 | 1/2014 | Jacobson et al. | |
| 8,828,618 B2 | 9/2014 | Day et al. | |
| 9,263,749 B2 | 2/2016 | Takata et al. | |
| 2002/0102450 A1 | 8/2002 | Badding et al. | |
| 2003/0096147 A1 | 5/2003 | Badding et al. | |
| 2004/0023101 A1 | 2/2004 | Jacobson et al. | |
| 2004/0028975 A1 | 2/2004 | Badding et al. | |
| 2004/0106031 A1 | 6/2004 | Sherman et al. | |
| 2004/0166394 A1 | 8/2004 | Sfeir et al. | |
| 2004/0180252 A1 | 9/2004 | Wortman | |
| 2004/0265669 A1 | 12/2004 | Yoo | |
| 2005/0014049 A1 | 1/2005 | Hart et al. | |
| 2005/0031518 A1 | 2/2005 | Munakata et al. | |
| 2005/0214613 A1 | 9/2005 | Sarkar et al. | |
| 2005/0221138 A1 | 10/2005 | Chinchure et al. | |
| 2005/0227134 A1 | 10/2005 | Nguyen | |
| 2005/0249993 A1 | 11/2005 | Horiuchi et al. | |
| 2005/0250004 A1 | 11/2005 | McLean et al. | |
| 2006/0016670 A1 | 1/2006 | Perkins | |
| 2006/0029860 A1 | 2/2006 | Ketcham et al. | |
| 2006/0099442 A1 | 5/2006 | Tietz et al. | |
| 2006/0153974 A1 | 7/2006 | Matsuzaki et al. | |
| 2006/0216575 A1 | 9/2006 | Cassidy | |
| 2007/0037031 A1 | 2/2007 | Cassidy et al. | |
| 2007/0072070 A1 | 3/2007 | Quek et al. | |
| 2007/0087250 A1 | 4/2007 | Lewis et al. | |
| 2007/0134537 A1 | 6/2007 | Reisdorf et al. | |
| 2007/0184324 A1 | 8/2007 | Lyons et al. | |
| 2007/0259242 A1 | 11/2007 | Schaevitz et al. | |
| 2008/0124602 A1 | 5/2008 | Larsen et al. | |
| 2008/0160376 A1 | 7/2008 | Badding et al. | |
| 2008/0199738 A1 | 8/2008 | Perry et al. | |
| 2009/0011307 A1 | 1/2009 | Lee et al. | |
| 2009/0035635 A1 | 2/2009 | Bae et al. | |
| 2009/0078025 A1 | 3/2009 | Singh et al. | |
| 2009/0148743 A1 | 6/2009 | Day et al. | |
| 2009/0162735 A1 | 6/2009 | Hasegawa | |
| 2009/0169958 A1 | 7/2009 | Lin | |
| 2010/0035101 A1 | 2/2010 | Maier et al. | |
| 2010/0055533 A1 | 3/2010 | Kebbede et al. | |
| 2010/0092829 A1 | 4/2010 | Fontaine et al. | |
| 2010/0119886 A1 | 5/2010 | Nielsen et al. | |
| 2010/0209802 A1 | 8/2010 | Armstrong et al. | |
| 2010/0279194 A1 | 11/2010 | Elangovan et al. | |
| 2011/0033779 A1 | 2/2011 | Badding et al. | |
| 2012/0129068 A1 | 5/2012 | Narendar et al. | |
| 2012/0186976 A1 | 7/2012 | Laucournet et al. | |
| 2012/0244456 A1 | 9/2012 | Muecke et al. | |
| 2012/0258241 A1 | 10/2012 | Tucker et al. | |
| 2012/0321981 A1 | 12/2012 | Liu | |
| 2012/0321982 A1 | 12/2012 | Liu et al. | |
| 2012/0321984 A1 | 12/2012 | Goettler et al. | |
| 2012/0321994 A1 | 12/2012 | Liu et al. | |
| 2013/0122393 A1 | 5/2013 | Liu et al. | |
| 2013/0230644 A1* | 9/2013 | Armstrong | H01M 8/0245 427/115 |
| 2014/0017596 A1 | 1/2014 | Takata | |
| 2016/0020470 A1 | 1/2016 | Jung et al. | |

FOREIGN PATENT DOCUMENTS

| | | |
|---|---|---|
| DE | 4422624 A1 | 1/1996 |
| DE | 19627504 C1 | 10/1997 |
| DE | 19932194 A1 | 1/2001 |
| DE | 10050010 A1 | 4/2002 |
| DE | 10306649 A1 | 9/2004 |
| EP | 0532024 A1 | 3/1997 |
| EP | 0876687 B1 | 10/2002 |
| EP | 1230706 B1 | 3/2004 |
| EP | 0815607 B1 | 5/2004 |
| EP | 1596457 A2 | 11/2005 |
| EP | 1624521 A1 | 2/2006 |
| EP | 1472754 B1 | 8/2006 |
| EP | 1768205 A1 | 3/2007 |
| EP | 1850412 A1 | 10/2007 |
| EP | 1852930 A1 | 11/2007 |
| EP | 1304755 A2 | 12/2007 |
| EP | 2276094 A1 | 1/2011 |
| EP | 2462644 A1 | 6/2012 |
| JP | H7-45289 | 2/1995 |
| JP | H11-501764 | 2/1999 |
| JP | 11-307114 A | 11/1999 |
| JP | 2002-283341 | 10/2002 |
| JP | 2005-135729 A | 5/2005 |
| JP | 2009-212046 | 9/2009 |
| JP | 2010-535290 | 11/2010 |
| JP | 5097865 | 12/2012 |
| WO | 9957780 A1 | 11/1999 |
| WO | 0229917 A1 | 4/2002 |
| WO | 2003007403 A1 | 1/2003 |
| WO | 03063285 A1 | 7/2003 |
| WO | 2004046627 A2 | 6/2004 |
| WO | 2005122300 A2 | 12/2005 |
| WO | 2006059943 A1 | 6/2006 |
| WO | 2006082057 A2 | 8/2006 |
| WO | 2008085488 A1 | 7/2008 |
| WO | 2008091801 A2 | 7/2008 |
| WO | 2008103253 A1 | 8/2008 |
| WO | 2009008979 | 1/2009 |
| WO | 2009085143 A1 | 7/2009 |
| WO | 2012133263 A1 | 10/2012 |
| WO | 2012173990 A1 | 12/2012 |
| WO | 2012173997 A2 | 12/2012 |
| WO | 2012174000 A2 | 12/2012 |
| WO | 2012174002 A2 | 12/2012 |
| WO | 2012174004 A3 | 12/2012 |

OTHER PUBLICATIONS

Schuler et al., "Mitigating Cr Contamination by Hot Air Filtering in Solid Oxide Fuel Cells," Electrochemical and Solid-state Letters, vol. 14(12), Nov. 2011, 4 pp.

Taniguchi et al., "Suppression of Chromium Diffusion to an SOFC Cathode from an Alloy Separator by a Cathode Second Layer," Denki Kagaku, Sanyo Electric Co., Ltd., Feb. 13, 1996, 7 pp.

International Search Report and Written Opinion of counterpart international application No. PCT/US2014/028159, dated Jul. 28, 2014, 11 pp.

International Preliminary Report on Patentability from International Application No. PCT/US2014/028159, dated Sep. 24, 2015, 7 pp.

Notice of Eligibility for Grant from counterpart Singapore Application No. 11201507656P, dated Jan. 19, 2017, 5 pp.

(56) References Cited

OTHER PUBLICATIONS

Miyoshi et al., "Mixed Conductivity and Oxygen Permeability of Doped Pr2NiO4-Based Oxides," Journal of the Electrochemical Society, 154 (1), Nov. 17, 2006, pp. B57-B62.

Yashima et al., "Crystal Structure, Diffusion Path, and Oxygen Permeability of a Pr2NiO4-Based Mixed Conductor (Pr0.9La0.1)2(Ni0.74Cu0.21 Ga0.05)O4+σ," Journal of the American Chemical Society, vol. 32, No. 7, Feb. 1, 2010, pp. 2385-2392.

Sadykov et al., "In Situ X-ray Diffraction Studies of Pr2—xNiO4 + σ Crystal Structure Relaxation Caused by Oxygen Loss," Elsevier, Solid State Ionics, vol. 262, Feb. 18, 2014, pp. 918-922.

Mauvy et al., "Electrode Properties of Ln2NiO4+σ (LN=La, Nd, Pr)," Journal of the Electrochemical Society, 153 (8), Jun. 13, 2006, pp. A1547-A1553.

Lou et al., "Preparation and Electrochemical Characterization of Ruddlesden-Popper Oxide La4Ni3O10 Cathode for IT-SOFCs by Sol-gel Method," Journal of Solid State Electrochemistry, vol. 17, No. 10, Jul. 11, 2013, pp. 2703-2709.

Solis et al., "Study of Pr and Pr and Co Doped La2NiO4+σ as Cathodes for La5.5WO11.25-σ Based Protonic Conducting Fuel Cells," Journal of Power Sources, Elsevier, vol. 240, May 21, 2013, pp. 691-697.

Wei et al., "Enhancement of Oxygen Permeation Through U-Shaped K2NiF4-Type Oxide Hollow Fiber Membranes by Surface Modifications," Separation and Purification Technology, Elsevier, vol. 110, Mar. 14, 2013, pp. 74-80.

Kovalevsky et al., "Oxygen Permeability, Stability and Electrochemical Behavior of Pr2NiO4+σ-Based Materials," J Electroceram, vol. 18, Springer, Feb. 24, 2007, pp. 205-218.

Examination Report from counterpart European Application No. 14719479.9, dated Apr. 25, 2017, 5 pp.

Choisnet, "Structure and Bonding Anisotropy in Intergrowth Oxides: A Clue to the Manifestation of Bidimensionality in T-, T'-, and T*-Type Structures," Journal of Solid State Chemistry, vol. 147, No. 1, Oct. 1999, pp. 379-389.

Ferchaud et al., "High performance praseodymium nickelate oxide cathode for low temperature solid oxide fuel cell," Journal of Power Sources, vol. 196, Sep. 22, 2010, pp. 1872-1879.

Huang et al., "Bi-layer structures as solid oxide fuel cell interconnections," Solid State Ionics, vol. 177, www.elsevier.com/locate/ssi, Apr. 20, 2005, 4 pp.

Hui et al., "Electrical Properties of Yttrium-Doped Strontium Titanate under Reducing Conditions," Journal of The Electrochemical Society, vol. 149, No. 1, Nov. 20, 2001, 10 pp.

Kharton et al., "Ionic transport in oxygen-hyperstoichiometric phases with K2NiF4-type structure," Solid State Ionics, vol. 143, Nos. 3, 4, Jul. 2001, pp. 337-353, http://www.elsevier.com.

Kharton et al., "Oxygen ion transport in La2NiO4-based ceramics," Journal of Materials Chemistry, vol. 9, Jul. 15, 1999, 7 pp.

Kovalevsky et al., "Oxygen permeability, stability, and electrochemical behavior of Pr2NiO4+d-based materials," Journal of Electroceramics, vol. 27, Springer Science + Business Media, LLC, Feb. 24, 2007, 14 pp.

Kovalevsky et al., "Stability and oxygen transport properties of Pr2NiO4+d ceramics," Journal of the European Ceramic Society, vol. 27, ScienceDirect, Mar. 28, 2007, pp. 4269-4272.

Lai et al., "Design Considerations for Segmented-in-Series Fuel Cells," Journal of Power Sources, vol. 147, No. 1-2, Feb. 21, 2005, 10 pp.

Pillai et al., "Short-period Segmented-in-Series Solid Oxide Fuel Cells on Flattened Tube Supports" Journal of Power Sources, vol. 163, No. 2, Jan. 1, 2007, 6 pp.

Marina et al., "Thermal, electrical, and electrocatalytical properties of lanthanum-doped strontium titanate," Solid State Ionics, vol. 149, retrieved from www.elsevier.com, Feb. 28, 2002, 8 pp.

Mauvy et al., "Oxygen electrode reaction on Nd2NiO4+d cathode materials: impedance spectroscopy study," Solid State Ionics, vol. 158, Elsevier, Jul. 25, 2002, pp. 17-28.

Nomura et al., "Electrode properties of doped Pr2NiO4-based oxide cathode for intermediate-temperature SOFCs," Journal of the Ceramic Society of Japan, vol. 120, The Ceramic Society of Japan, Oct. 4, 2012, pp. 534-538.

Yi, et al., Fabrication of a MnCo2O4/gadolinia-doped Ceria (GDC) Dual-phase Composite Membrane for Oxygen Separation, Journal of the Korean Ceramic Society, vol. 47, No. 2, pp. 199-204, Feb. 22, 2010.

Fu et al., "LA0.4 SR0.6 Ti1-xMNxOx3-[delta] Perovskites as Anode Materials for Solid Oxide Fuel Cells," Journal of the Electrochemical Society, vol. 153, No. 4, Feb. 2006, 10 pp.

Skinner et al., "Oxygen ion Conductors," Materials Today, Elsevier Science Ltd, Mar. 2003, 8 pp.

Weber et al., "The Influence of A-Site-Deficiency on the Performance of Strontium Doped Lanthanum-Manganate Perovskite Type SOFC-Cathodes," Proceedings on the 17th Risoe International Symposium on Materials Science: High Temperature Electrochemistry: Ceramics and Metals, Jan. 1, 1996, 6 pp.

Hui et al. "Evaluation of yttrium-doped SrTiO3 as an anode for solid oxide fuel cells," Journal of the European Ceramic Society, vol. 22, retrieved from www.elsevier.com, Oct. 28, 2001, 9 pp.

Invitation to Respond to Written Opinion from counterpart Singapore Application No. 11201507656P, dated Jun. 23, 2016, 7 pp.

Examination Report from counterpart Australian Application No. 2014227989, dated Sep. 6, 2017, 4 pp.

Response to Examination Report dated Apr. 25, 2017, from counterpart European Application No. 14719479.9, filed Nov. 6, 2017, 6 pp.

First Office Action and Search Report, and translation thereof, from counterpart Chinese Application No. 201480024849.0, dated Apr. 20, 2017, 10 pp.

\* cited by examiner

| PCT104_4x WDS Quantive Analysis | | CCC surface | CCC bulk | CCC/cath | cath bulk | cath/ele | ele bulk | degr. ASR/1000hrs |
|---|---|---|---|---|---|---|---|---|
| A1: LSM85-90:3YSZ | wt% | | | | | | | 0.008 |
| | at% | | | | | | | |
| A2: LSM85-90:10ScSZ | wt% | | | | | | | 0.01 |
| | at% | | | | | | | |
| B1: LSM80-98:10ScSZ | wt% | 0.58 | 0.57 | 0.54 | 0.28 | 0.32 | 0.005 | 0.0005 |
| | at% | 0.61 | 0.56 | 0.56 | 0.25 | 0.27 | 0.004 | |
| B2: LSM80-95:10ScSZ | wt% | 0.65 | 0.64 | 0.60 | 0.36 | 0.66 | 0.001 | -0.0001 |
| | at% | 0.59 | 0.67 | 0.67 | 0.31 | 0.55 | 0.001 | |
| test condition: 900C, 4bar, 14.6%O2 wet | | | | | | | | |

FIG. 3

FUEL CELL SYSTEM CONFIGURED TO CAPTURE CHROMIUM

This application claims the benefit of U.S. Provisional Application No. 61/799,914, filed on Mar. 15, 2013, the entire content of which is incorporated herein by reference.

This invention was made with Government support under Assistance Agreement No. DE-FE0000303 awarded by Department of Energy. The Government has certain rights in this invention.

TECHNICAL FIELD

The disclosure generally relates to fuel cells, such as solid oxide fuel cells.

BACKGROUND

Fuel cells, fuel cell systems and interconnects for fuel cells and fuel cell systems remain an area of interest. Some existing systems have various shortcomings, drawbacks, and disadvantages relative to certain applications. Accordingly, there remains a need for further contributions in this area of technology.

SUMMARY

Examples of the disclosure relate to solid oxide fuel cell system including one or more features configured to capture Cr vapor species in the fuel cell system. For example, the fuel cell system may include a cathode conductive layer and cathode, where at least one of the cathode or cathode conductive layer includes an exsolute oxide to capture Cr vapor species in, e.g., the oxidant or air side of the fuel cell. For example, an LSM cathode and/or LSM cathode conductive layer may include exsolute MnOx, which reacts with Cr vapor species to capture the Cr species to prevent or reduce Cr poisoning of the cathode.

In one example, the disclosure relates to a fuel cell system including a cathode, a cathode conductor layer adjacent the cathode, an electrolyte separated from the cathode conductor layer by the cathode, and an anode separated from the cathode by the electrolyte, wherein the anode, cathode conductor layer, cathode, and electrolyte are configured to form an electrochemical cell, and wherein the cathode conductor layer includes an exsolute oxide configured to capture Cr vapor species present in the fuel cell system.

In another example, the disclosure relates to a method comprising forming a fuel cell system, wherein the fuel cell system includes a cathode, a cathode conductor layer adjacent the cathode, an electrolyte separated from the cathode conductor layer by the cathode, and an anode separated from the cathode by the electrolyte, wherein the anode, cathode conductor layer, cathode, and electrolyte are configured to form an electrochemical cell, and wherein the cathode conductor layer includes an exsolute oxide configured to capture Cr vapor species present in the fuel cell system.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

The description herein makes reference to the accompanying drawings wherein like reference numerals refer to like parts throughout the several views.

FIG. 3 is a plot illustrating experimental results.

Figure 1:
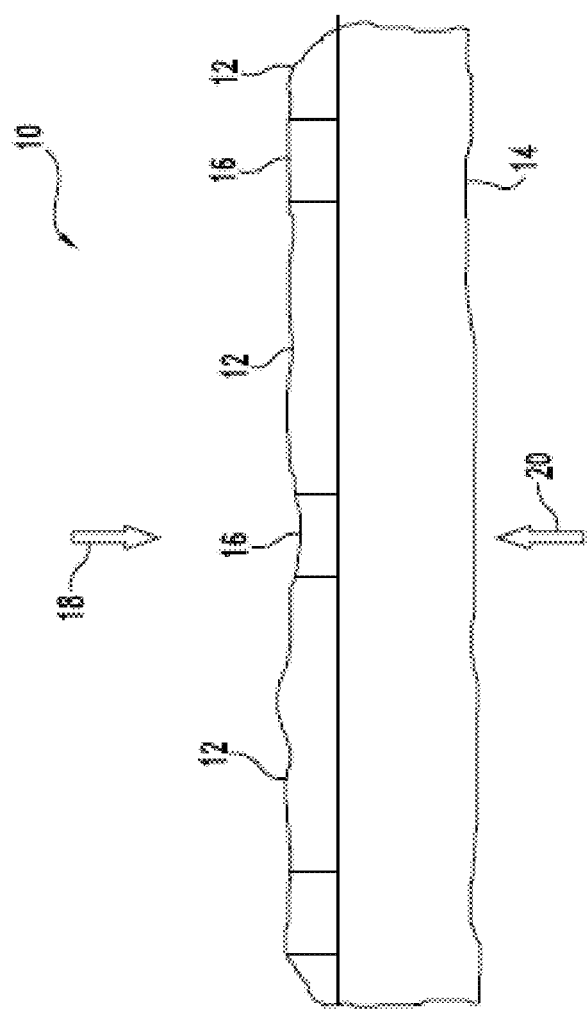
FIG. 1 is a schematic diagram illustrating an example fuel cell system in accordance with an embodiment of the present disclosure.

Referring to the drawings, some aspects of a non-limiting example of a fuel cell system in accordance with an embodiment of the present disclosure is schematically depicted. In the drawing, various features, components and interrelationships therebetween of aspects of an embodiment of the present disclosure are depicted. However, the present disclosure is not limited to the particular embodiments presented and the components, features and interrelationships therebetween as are illustrated in the drawings and described herein.

DETAILED DESCRIPTION

Chromium species may be contaminants to cathodes of solid oxide fuel cell (SOFC), e.g., as present in the oxide or air supply of the SOFC. The Cr-species may originate from metal interconnects of planar SOFC technologies. Such Cr-species may be the most aggressive source of chromium, e.g., if the metal interconnect is adjacent and connected to the cell, the chromium can transport to the cell by solid state diffusion and by vapor phase. A second source of chromium is from the balance of plant (BOP) metallic hardware such as heat exchangers, reformers, pipework and instrumentation. In some example, such BOP Cr-species may be of most concern if primary interconnects are printed precious metal cermets or ceramic-based. Further, in some cases, there may be an effort to minimize chromium evolution from metal interconnects. In some examples, coatings may be applied to metal interconnects that react with chromium scales that form on the metals and which also can capture the chromium vapor species that evolve. Such examples do not protect the cell areas such as, e.g., cathodes, specifically from Cr, rather they attempt to reduce the amount of Cr-species evolving from a primary Cr source.

Example cathodes for fuel cell systems include LSM-based cathode, which may allow for desirable performance and durability, e.g., for ZrO2-based SOFC at high temperature. However, like other cathode compositions, such cathodes may be poisoned by Cr contamination described above. Accordingly, to prevent or reduce such Cr poisoning in the cathodes, it may be desirable to remove Cr species generated in upstream of solid oxide fuel cell system (balance of plant) and/or metallic interconnect before reaching the cathode/electrolyte interface of a fuel cell In accordance with examples of the disclosure, a fuel cell system may include a cathode conductive layer formed over an active cathode layer, where the cathode conductive layer and/or cathode includes a compound configured to capture Cr vapor species present in the fuel cell system, e.g., in the oxide/air side of the fuel cell. Rather than mixing or otherwise adding the Cr vapor capturing compound separately to the powder or other material used to form the cathode conductive layer, the chemistry of the cathode conductive layer may be selected such during operation of the fuel cell, exsolute oxides is present in the cathode conductive layer and/or cathode which capture Cr vapor species in the fuel cell, e.g., by reacting with the Cr vapor species. In this manner, the cathode conductive layer and/or cathode may reduce or prevent the cathode from poisoning by the Cr vapor species.

As one example, in the case of a cathode conductive layer (also referred to as cathode current collector or CCC) formed of LSM and located on top of the typical LSM+ionic phase composite cathode, exsolute MnOx in cathode conductive layer may function as Cr capturing material. For example, specifically designed A-site deficient LSM may be a good material to function as both current collector and Cr capturing layer because MnOx in excess of the equilibrium concentration intends to segregate from LSM structure and exists as free MnOx during fuel cell processing and operation due to its thermodynamic instability of LSM when Mn is highly rich. Such exsolute MnOx can interact with Cr in vapor phase to form (Mn,Cr)3O4 spinel and deposited in CCC layer to avoid cathode poisoning.

As will be described below, in some examples, additional Cr capturing materials may also be intentionally added into current conductor layer (e.g., at contents greater than achievable simply be non-stoichiometric, A-site deficiency) to also capture Cr species from the air to protect the cathode from Cr poisoning. This approach for Cr capture can apply to other cathode materials, such as, LSCF cathode, LSF cathode, PSM cathode, nickelate cathode etc., however the preferred gettering material of the CCC layer would be different depending on the class of the cathode material. When other cathode materials are used, both cathode and CCC formulations can also be intentionally designed to exsolute corresponding oxide to serve as Cr-gettering material. For example, the exsoluted Cr-capturing material would be CoO and/or $Fe_2O_3$ for LSCF cathode, $Fe_2O_3$ for LSF cathode, MnOx for PSM cathode, and NiO for nickelate cathode.

Some examples of the disclosure include particular selection of LSM chemistries for the cathode and/or cathode current collecting layers such that residual amounts of MnOx arise as a result of SOFC operating conditions coupled with local materials interdiffusion into ionic phases, and where these dispersed MnOx phases from established LSM cathodes and current collection serve to capture Cr-vapor species that originate, e.g., from balance of plant components. The cathode current collector and/or cathode layer provide their expected electrochemical and current collecting functions while also serve as in-situ formed sites for chromium capture.

Compared to that of an approach in which a separate layer formed of Cr capturing compound is printed on top of the cathode or CCC, examples of the disclosures may capture Cr from multiple sources within a SOFC system. For instance, either from balance of plant components such as heat exchangers and pipe work or from metallic interconnect that are most frequently used in planar SOFC systems, and minimize the amount of Cr-species that would enter the active cathode and especially reach the cathode/electrolyte interface, thus protecting the cathode from poisoning and degradation of electrochemical performance. However, in some examples, a separate layer formed of Cr capturing compounds may be included in addition to the CCC and/or cathode including an exsolute oxide for capturing Cr vapor species. The Cr capturing layer on top of the cathode or CCC may be non-conductive oxides, such as alkaline earth oxide, for example, MgO, which may be preferred, or rare earth metal oxide, for example, $Y_2O_3$.

FIG. 1 is a schematic diagram illustrating an example fuel cell system 10 in accordance with an embodiment of the present disclosure. As shown in FIG. 1, fuel cell system 10 includes a plurality of electrochemical cells 12 (or "individual fuel cells") formed on substrate 14. As will be described below, one or more of the plurality of electrochemical cells 12 may include a cathode and/or cathode conductive layer of the example compositions described herein configured to capture Cr vapor species in fuel cell 10. Electrochemical cells 12 are coupled together in series by interconnects 16. Fuel cell system 10 is a segmented-in-series arrangement deposited on a flat porous ceramic tube, although it will be understood that the present disclosure is equally applicable to segmented-in-series arrangements on other substrates, such on a circular porous ceramic tube. In various embodiments, fuel cell system 10 may be an integrated planar fuel cell system or a tubular fuel cell system.

Each electrochemical cell 12 includes an oxidant side 18 and a fuel side 20. The oxidant is generally air, but could also be pure oxygen ($O_2$) or other oxidants, e.g., including dilute air for fuel cell systems having air recycle loops, and is supplied to electrochemical cells 12 from oxidant side 18. Substrate 14 may be specifically engineered porosity, e.g., the porous ceramic material is stable at fuel cell operation conditions and chemically compatible with other fuel cell materials. In other embodiments, substrate 14 may be a surface-modified material, e.g., a porous ceramic material having a coating or other surface modification, e.g., configured to prevent or reduce interaction between electrochemical cell 12 layers and substrate 14. A fuel, such as a reformed hydrocarbon fuel, e.g., synthesis gas, is supplied to electrochemical cells 12 from fuel side 20 via channels (not shown) in porous substrate 14. Although air and synthesis gas reformed from a hydrocarbon fuel may be employed in some examples, it will be understood that electrochemical cells using other oxidants and fuels may be employed without departing from the scope of the present disclosure, e.g., pure hydrogen and pure oxygen. In addition, although fuel is supplied to electrochemical cells 12 via substrate 14, it will be understood that in other embodiments, the oxidant may be supplied to the electrochemical cells via a porous substrate.

Figure 2:
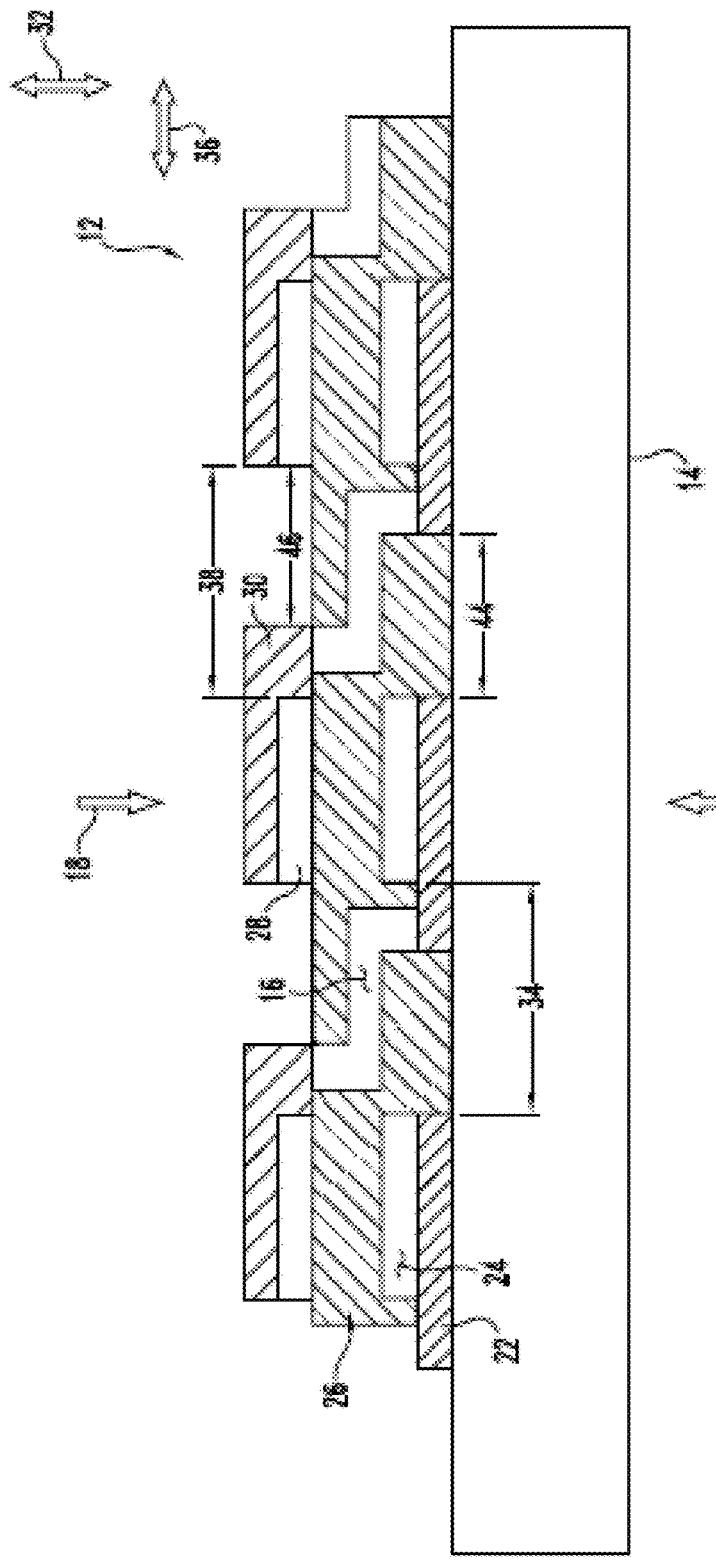
FIG. 2 is a schematic diagram illustrating an example cross section of a fuel cell system in accordance with an embodiment of the present disclosure.

FIG. 2 is a schematic diagram illustrating an example cross section of fuel cell system 10 in accordance with an embodiment of the present disclosure. Fuel cell system 10 may be formed of a plurality of layers screen printed onto substrate 14. This may include a process whereby a woven mesh has openings through which the fuel cell layers are deposited onto substrate 14. The openings of the screen determine the length and width of the printed layers. Screen mesh, wire diameter, ink solids loading and ink rheology may determine the thickness of the printed layers. Fuel cell system 10 layers include an anode conductive layer 22, an anode layer 24, an electrolyte layer 26, a cathode layer 28 and a cathode conductive layer 30. In one form, electrolyte layer 26 may be a single layer or may be formed of any number of sub-layers. It will be understood that FIG. 2 is not necessarily to scale. For example, vertical dimensions are exaggerated for purposes of clarity of illustration.

In each electrochemical cell 12, anode conductive layer 22 conducts free electrons away from anode 24 and conducts the electrons to cathode conductive layer 30 via interconnect 16. Cathode conductive layer 30 conducts the electrons to cathode 28. Interconnect 16 is embedded in electrolyte layer 26, and is electrically coupled to anode conductive layer 22, and extends in direction 32 from anode conductive layer 22 through electrolyte layer 26, then in direction 36 from one electrochemical cell 12 to the next adjacent electrochemical cell 12, and then in direction 32 again toward cathode conductive layer 30, to which interconnect 16 is electrically coupled. In particular, at least a portion of interconnect 16 is embedded within an extended portion of electrolyte layer 26, wherein the extended portion of electrolyte layer 26 is a portion of electrolyte layer 26 that extends beyond anode 24 and cathode 28, e.g., in direction 32, and is not sandwiched between anode 24 and cathode 28.

Interconnects 16 for solid oxide fuel cells (SOFC) are preferably electrically conductive in order to transport electrons from one electrochemical cell to another; mechanically and chemically stable under both oxidizing and reducing environments during fuel cell operation; and nonporous, in order to prevent diffusion of the fuel and/or oxidant through the interconnect. If the interconnect is porous, fuel may diffuse to the oxidant side and burn, resulting in local hot spots that may result in a reduction of fuel cell life, e.g., due to degradation of materials and mechanical failure, as well as reduced efficiency of the fuel cell system. Similarly, the oxidant may diffuse to the fuel side, resulting in burning of the fuel. Severe interconnect leakage may significantly reduce the fuel utilization and performance of the fuel cell, or cause catastrophic failure of fuel cells or stacks.

For segmented-in-series cells, fuel cell components may be formed by depositing thin films on a porous ceramic substrate, e.g., substrate 14. In one form, the films are deposited via a screen printing process, including the interconnect. In other embodiments, other process may be employed to deposit or otherwise form the thin films onto the substrate. The thickness of interconnect layer may be 5 to 30 microns, but can also be much thicker, e.g., 100 microns.

Interconnect 16 may be formed of a precious metal including Ag, Pd, Au and/or Pt and/or alloys thereof, although other materials may be employed without departing from the scope of the present disclosure. For example, in other embodiments, it is alternatively contemplated that other materials may be employed, including precious metal alloys, such as Ag—Pd, Ag—Au, Ag—Pt, Au—Pd, Au—Pt, Pt—Pd, Ag—Au—Pd, Ag—Au—Pt, Ag—Au—Pd—Pt and/or binary, ternary, quaternary alloys in the Pt—Pd—Au—Ag family, inclusive of alloys having minor non-precious metal additions, cermets composed of a precious metal, precious metal alloy, and an inert ceramic phase, such as alumina, or ceramic phase with minimum ionic conductivity which will not create significant parasitics, such as YSZ (yttria stabilized zirconia, also known as yttria doped zirconia, yttria doping is 3-8 mol %, preferably 3-5 mol %), ScSZ (scandia stabilized zirconia, scandia doping is 4-10 mol %, preferably 4-6 mol %), doped ceria, and/or conductive ceramics, such as conductive perovskites with A or B-site substitutions or doping to achieve adequate phase stability and/or sufficient conductivity as an interconnect, e.g., including at least one of doped strontium titanate (such as $La_xSr_{1-x}TiO_{3-\delta}$, x=0.1 to 0.3), LSCM ($La_{1-x}SrxCr_{1-y}Mn_yO_3$, x=0.1 to 0.3 and y=0.25 to 0.75), doped yttrium chromites (such as $Y_{1-x}Ca_xCrO_{3-\delta}$, $x=$0.1-0.3) and/or other doped lanthanum chromites (such as $La_{1-x}Ca_xCrO_{3-\delta}$, where x=0.15-0.3), and conductive ceramics, such as doped strontium titanate, doped yttrium chromites, LSCM ($La_{1-x}Sr_xCr_{1-y}Mn_yO_3$), and other doped lanthanum chromites. In one example, interconnect 16 may be formed of y(PdxPt1-x)-(1-y)YSZ. Where x is from 0 to 1 in weight ratio, preferably x is in the range of 0 to 0.5 for lower hydrogen flux. Y is from 0.35 to 0.80 in volume ratio, preferably y is in the range of 0.4 to 0.6.

Anode conductive layer 22 may be an electrode conductive layer formed of a nickel cermet, such as such as Ni-YSZ (e.g., where yttria doping in zirconia is 3-8 mol %,), Ni-ScSZ (e.g., where scandia doping is 4-10 mol %, preferably including a second doping for example 1 mol % ceria for phase stability for 10 mol % scandia-$ZrO_2$) and/or Ni-doped ceria (such as Gd or Sm doping), doped lanthanum chromite (such as Ca doping on A site and Zn doping on B site), doped strontium titanate (such as La doping on A site and Mn doping on B site), $La_{1-x}Sr_xMn_yCr_{1-y}O_3$ and/or Mn-based R-P phases of the general formula a $(La_{1-x}Sr_x)_{n+1}Mn_nO_{3n+1}$ Alternatively, it is considered that other materials for anode conductive layer 22 may be employed such as cermets based in part or whole on precious metal. Precious metals in the cermet may include, for example, Pt, Pd, Au, Ag, and/or alloys thereof. The ceramic phase may include, for example, an inactive non-electrically conductive phase, including, for example, YSZ, ScSZ and/or one or more other inactive phases, e.g., having desired coefficients of thermal expansion (CTE) in order to control the CTE of the layer to match the CTE of the substrate and electrolyte. In some embodiments, the ceramic phase may include $Al_2O_3$ and/or a spinel such as $NiAl_2O_4$, $MgAl_2O_4$, $MgCr_2O_4$, $NiCr_2O_4$. In other embodiments, the ceramic phase may be electrically conductive, e.g., doped lanthanum chromite, doped strontium titanate and/or one or more forms of LaSrMnCrO and/or R-P phases of the general formula $(La_{1-x}Sr_x)_{n+1}Mn_nO_{3n+1}$ Electrolyte layer 26 may be made from a ceramic material. In one form, a proton and/or oxygen ion conducting ceramic, may be employed. In one form, electrolyte layer 26 is formed of YSZ, such as 3YSZ and/or 8YSZ. In other embodiments, electrolyte layer 26 may be formed of ScSZ, such as 4ScSZ, 6ScSz and/or 10Sc1CeSZ in addition to or in place of YSZ. In other embodiments, other materials may be employed. For example, it is alternatively considered that electrolyte layer 26 may be made of doped ceria and/or doped lanthanum gallate. In any event, electrolyte layer 26 is substantially impervious to diffusion therethrough of the fluids used by fuel cell 10, e.g., synthesis gas or pure hydrogen as fuel, as well as, e.g., air or O2 as an oxidant, but allows diffusion of oxygen ions or protons.

Cathode layer 28 may be formed at least one of LSM ($La_{1-x}Sr_xMnO_3$, where x=0.1 to 0.3), $La_{1-x}Sr_xFeO_3$, (such as where x=0.3), $La_{1-x}Sr_xCo_yO_3$ (such as $La_{0.6}Sr_{0.4}Co_{0.2}Fe_{0.8}O_3$) and/or $Pr_{1-x}Sr_xMnO_3$ (such as $Pr_{0.8}Sr_{0.2}MnO_3$), although other materials may be employed without departing from the scope of the present invention. For example, it is alternatively considered that Ruddlesden-Popper nickelates and $La_{1-x}Ca_xMnO_3$ (such as $La_{0.8}Ca_{0.2}MnO_3$) materials may be employed.

Cathode conductive layer 30 may be an electrode conductive layer formed of a conductive ceramic, for example, at least one of $LaNi_xFe_{1-x}O_3$ (such as, e.g., $LaNi_{0.6}Fe_{0.4}O_3$), $La_{1-x}Sr_xMnO_3$ (such as $La_{0.75}Sr_{0.25}MnO_3$), and/or $Pr_{1-x}Sr_xCoO_3$, such as $Pr_{0.8}Sr_{0.2}CoO_3$. In other embodiments, cathode conductive layer 30 may be formed of other materials, e.g., a precious metal cermet, although other materials may be employed without departing from the scope of the present invention. The precious metals in the precious metal cermet may include, for example, Pt, Pd, Au, Ag and/or alloys thereof. The ceramic phase may include, for example, YSZ, ScSZ and $Al_2O_3$, or other non-conductive ceramic materials as desired to control thermal expansion. As described herein, cathode 28 and/or cathode conductive layer 30 may include exsolute oxide, e.g., MnOx, to capture Cr vapor species present in fuel cell system 10.

Any suitable technique may be employed to form electrochemical cell 12 of FIGS. 1 and 2. In the example of FIG. 2, anode conductive layer 22 may be printed directly onto substrate 14, as is a portion of electrolyte 26. Anode layer 24 may be printed onto anode conductive layer 22. Portions of electrolyte layer 26 may be printed onto anode layer 24, and portions of electrolyte layer 26 are printed onto anode conductive layer 22 and onto substrate 14. Cathode layer 28 is printed on top of electrolyte layer 26. Portions of cathode conductive layer 30 are printed onto cathode layer 28 and onto electrolyte layer 26. Cathode layer 28 is spaced apart from anode layer 24 in a direction 32 by the local thickness of electrolyte layer 26.

Anode layer 24 includes anode gaps 34, which extend in a direction 36. Cathode layer 28 includes cathode gaps 38, which also extend in direction 36. In the example of FIG. 2, direction 36 is substantially perpendicular to direction 32, although the present disclosure is not so limited. Gaps 34 separate anode layer 24 into a plurality of individual anodes 40, one for each electrochemical cell 12. Gaps 38 separate cathode layer 28 into a corresponding plurality of cathodes 42. Each anode 40 and the corresponding cathode 42 that is spaced apart in direction 32 therefrom, in conjunction with the portion of electrolyte layer 26 disposed therebetween, form an electrochemical cell 12.

Similarly, anode conductive layer 22 and cathode conductive layer 30 have respective gaps 44 and 46 separating anode conductive layer 22 and cathode conductive layer 30 into a plurality of respective anode conductor films 48 and cathode conductor films 50. The terms, "anode conductive layer" and "anode conductor film" may be used interchangeably, in as much as the latter is formed from one or more layers of the former; and the terms, "cathode conductive layer" and "cathode conductor film" may be used interchangeably, in as much as the latter is formed from one or more layers of the former.

In some examples, anode conductive layer 22 has a thickness, i.e., as measured in direction 32, of approximately 5-15 microns, although other values may be employed without departing from the scope of the present disclosure. For example, it is considered that in other embodiments, the anode conductive layer may have a thickness in the range of approximately 5-50 microns. In yet other embodiments, different thicknesses may be used, e.g., depending upon the particular material and application.

Similarly, anode layer 24 may have a thickness, i.e., as measured in direction 32, of approximately 5-20 microns, although other values may be employed without departing from the scope of the present invention. For example, it is considered that in other embodiments, the anode layer may have a thickness in the range of approximately 5-40 microns. In yet other embodiments, different thicknesses may be used, e.g., depending upon the particular anode material and application.

Electrolyte layer 26 may have a thickness of approximately 5-15 microns with individual sub-layer thicknesses of approximately 5 microns minimum, although other thickness values may be employed without departing from the scope of the present invention. For example, it is considered that in other embodiments, the electrolyte layer may have a thickness in the range of approximately 5-40 microns. In yet other embodiments, different thicknesses may be used, e.g., depending upon the particular materials and application.

Cathode layer 28 has a thickness, i.e., as measured in direction 32, of approximately 10-20 microns, although other values may be employed without departing from the scope of the present invention. For example, it is considered that in other embodiments, the cathode layer may have a thickness in the range of approximately 10-50 microns. In yet other embodiments, different thicknesses may be used, e.g., depending upon the particular cathode material and application.

Cathode conductive layer 30 has a thickness, i.e., as measured in direction 32, of approximately 5-100 microns, although other values may be employed without departing from the scope of the present invention. For example, it is considered that in other embodiments, the cathode conductive layer may have a thickness less than or greater than the range of approximately 5-100 microns. In yet other embodiments, different thicknesses may be used, e.g., depending upon the particular cathode conductive layer material and application.

Although not shown in FIG. 2, in some examples, fuel cell system 10 may include one or more chemical barrier layers between interconnect 16 and adjacent components to reduce or prevent diffusion between the interconnect and adjacent components, e.g., an anode and/or an anode conductor film and/or cathode and/or cathode conductor film, may adversely affect the performance of certain fuel cell systems. In various embodiments, such a chemical barrier layer may be configured to prevent or reduce material migration or diffusion at the interface between the interconnect and an anode, and and/or between the interconnect and an anode conductor film, and/or between the interconnect and a cathode, and/or between the interconnect and a cathode conductor film which may improve the long term durability of the interconnect. For example, without a chemical barrier, material migration (diffusion) may take place at the interface between an interconnect formed of a precious metal cermet, and an anode conductor film and/or anode formed of a Ni-based cermet. The material migration may take place in both directions, e.g., Ni migrating from the anode conductive layer/conductor film and/or anode into the interconnect, and precious metal migrating from the interconnect into the conductive layer/conductor film and/or anode. The material migration may result in increased porosity at or near the interface between the interconnect and the anode conductor film and/or anode, and may result in the enrichment of one or more non or low-electronic conducting phases at the interface, yielding a higher area specific resistance (ASR), and hence resulting in reduced fuel cell performance. Material migration between the interconnect and the cathode and/or between the interconnect and the cathode conductor film may also or alternatively result in deleterious effects on fuel cell performance. Such a chemical barrier layer may be formed of one or both of two classes of materials; cermet and/or conductive ceramic.

Figure 4:
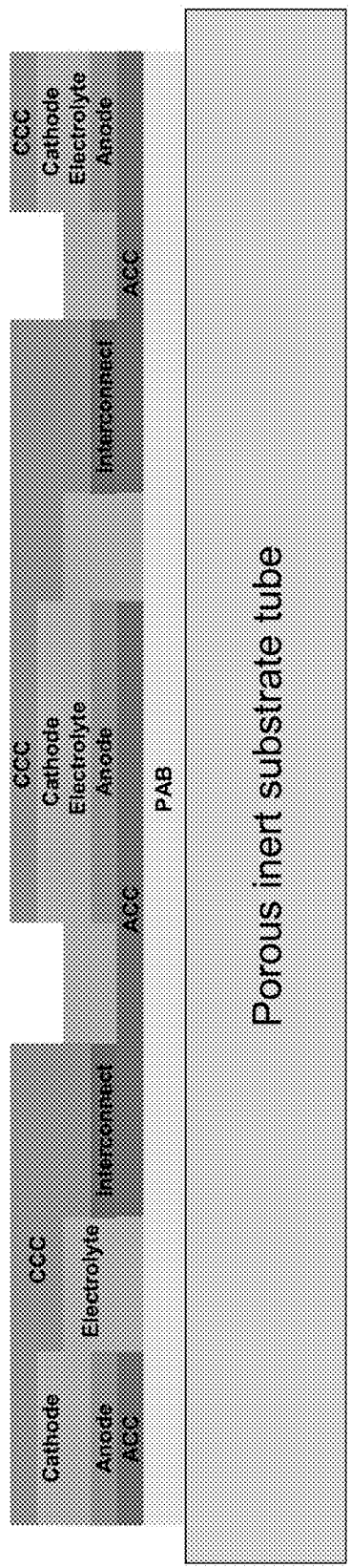
FIGS. 4 and 5 are schematic diagram illustrating example cross sections of a fuel cell system in accordance with an embodiment of the present disclosure.

FIG. 4 is a schematic diagram illustrating an example cross section of a fuel cell system in accordance with an embodiment of the present disclosure. The fuel cell system, and components/layers thereof, of FIG. 4 may be substantially the same or similar to that described for fuel cell system 10 with cells 14 in FIGS. 1 and 2.

As noted above, examples of the present disclosure may include one or more techniques and configurations for capturing Cr present in a fuel cell system, e.g., prior to migrating to a cathode layer, such as, e.g., cathode layer 28. As noted above, volatile Cr species may be responsible for the observed performance degradation of a solid oxide fuel cell due to Cr poisoning. The high-valent gaseous Cr species formed at high temperatures SOFC system exist in the forms of oxides, hydroxides, and oxyhydroxides. The chemical reactions between $Cr_2O_3(s)$ and gaseous Cr species can be expressed by:

$$Cr2O3(s)+(m-1.5)O2(g)=2CrOm(g)$$

$$2Cr2O3(s)+(m-3)O2(g)+2mH2O(g)=4Cr(OH)m(g)$$

$$2Cr2O3(s)+(m+2n-3)O2(g)+2mH2O(g)=4CrOn(OH)m(g)$$

During SOFC operation, the gaseous Cr species formed are first entrained in the air stream and then transported to the cathode side where they are reduced to solid Cr2O3(s). Normally, the deposition of Cr2O3(s) occurs preferentially at the reactive triple phase boundary (TPB) sites where oxygen molecules, electrons, and oxygen vacancies are available. However, the oxygen reduction of a cathode also occurs at these locations and has to compete with the oxygen reductions of gaseous high-valent species for the right to react. The coverage by a catalytically inactive Cr2O3(s) layer at reactive sites slows down the rate of oxygen reduction and therefore increases the resistance. As more Cr2O3(s) precipitates out at the TPBs, and the number for reactive sites access for oxygen molecules become fewer and fewer, degradation of the performance is observed.

As described above, examples of the disclosure relate to solid oxide fuel cell system including one or more features configured to capture Cr vapor species in the fuel cell system. For example, the fuel cell system may include a cathode conductive layer and cathode, where at least one of the cathode or cathode conductive layer includes an exsolute oxide to capture Cr vapor species in, e.g., the oxidant or air side of the fuel cell. For example, an LSM cathode and/or LSM cathode conductive layer may include exsolute MnOx, which reacts with Cr vapor species to capture the Cr species to prevent or reduce Cr poisoning of the cathode. However, while the composition of cathode and/or CCC is primarily described with regard to LSM with the corresponding MnOx as the exsolute oxide, other compositions are contemplated. For example, the exsoluted Cr-capturing material would be CoO and/or $Fe_2O_3$ for LSCF composition, $Fe_2O_3$ for LSF composition, MnOx for PSM composition, and NiO for nickelate composition.

In some fuel cell configurations, gaseous Cr species are reduced in an LSM CCC layer. The freshly deposited and fine-grained Cr2O3(s) particles possess high propensity to react with the free MnOx from A-site deficient LSM CCC and form thermal dynamic stable (Cr,Mn)3O4 spinel before they transport to LSM cathode. In this manner, the free MnOx (e.g., exsolute MnOx) in the CCC may capture the Cr vapor species. This mechanism was identified in subscale cells tested under simulated system conditions and analyzed by TEM.

In one example, A-site deficient LSM, (La1-xSrx)1-yMnO3 (0.02<y<0.2) may be used to form CCC 30 and/or cathode 28, where the equilibrium concentration of the LSM at the operating temperature and oxygen partial pressure on cathode side of the fuel cell results in free MnOx exsolution. Generally higher A-site deficient LSM formulation would exsolute more free MnOx. The selection of LSM formulation depends on the Cr concentration released from balance of plant or other metal parts in the fuel cell system. Preferred LSM formulation for CCC layer 30 is highly A-site deficient, e.g. 0.1≤y<0.2. The free MnOx segregated from LSM, can react with Cr to form spinel or other compound.

In some examples, additional Cr gettering material may be added into a CCC 30 and/or cathode 29 (e.g., LSM CCC layer), to achieve a better Cr capturing. The additional Cr capture material or "Cr gettering material" may be rare earth metal oxide, such as $Y_2O_3$, or alkaline earth oxide, such as MgO. In some examples, the additional Cr gettering added to CCC 30 do not require electrical conductivity since it only functions as Cr gettering material instead of conduction path for electrons.

Preferably, the CCC layer 30 has more Cr-gettering materials, either MnOx exsoluted from LSM phase during fuel cell operation and/or additional Cr-gettering material added to CCC layer, than active cathode layer 28 to minimize Cr vapor phase transportation to active cathode 28 and promote cathode performance and long term durability.

In some example, an A-site deficiency could be selected for the active LSM+ionic composite cathode that achieves some level of free MnOx exsolution to also provide for some Cr-capture within the active cathode 28, e.g., for Cr-species that find their way past the CCC layer 30. This MnOx content in active cathode 28 may be in addition or an alternative to the Cr capture material present in the CCC layer 30. For example, in case a small amount Cr is not fully blocked by CCC layer 30 the MnOx present in the active cathode 28 can preferentially react with Cr rather than the LSM phase, minimizing the degradation in the electrochemical performance. Free MnOx exsolution from active cathode 28 depends on the operating temperature and oxygen partial pressure on cathode side of the fuel cell, as well as the ionic phase used in the active cathode 28. If Scandia-doped zirconia or 8YSZ, in which MnOx has higher solubility, is used as ionic phase, high A-site deficient LSM formulation, such as 10% or high A-site deficient, e.g. y≥0.1, is preferred in order to exsolute enough free MnOx which is greater than the solubility limit of manganese oxide in the ionic phase of the cathode. If 3YSZ, in which MnOx has lower solubility, is used as ionic phase, relatively lower A-site deficient LSM formulation can be used, such as 5% A-site deficient, e.g. y=0.05.

In another example, additional Cr gettering material could be added into active cathode layer to capture more Cr vapor species without affecting cathode performance. The Cr gettering materials may be transition metal oxides, such as $FeO_x$, $CoO_x$, $MnO_x$, $NiO_x$, $CuO_x$, etc. rare earth metal oxides, such as $Y_2O_3$, $La_2O_3$, alkaline earth oxide, such as MgO. One or more additional Cr gettering material can be added into cathode ink as oxide form, and co-fired with cathode during cell processing.

Figure 5:
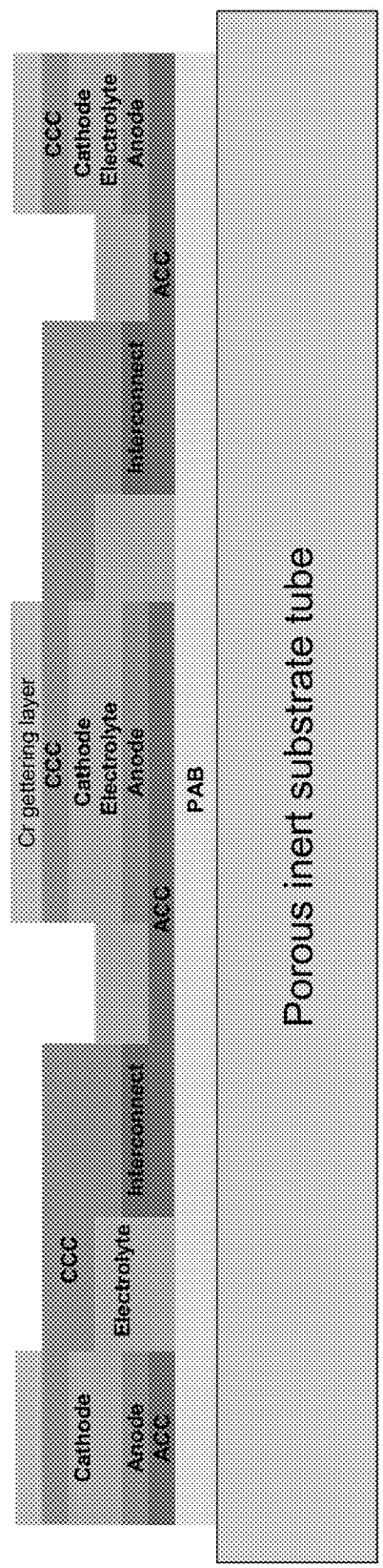

FIG. 5 is a schematic diagram illustrating another example cross section of a fuel cell system in accordance with an embodiment of the present disclosure. The fuel cell system of FIG. 4 may be substantially the same or similar to that described for fuel cell system 10 with cells 14 in FIGS. 1 and 2, and in FIG. 4. However, the system of FIG. 5 includes an additional thin layer deposited on the surface of the CCC layer (labeled as "Cr gettering layer"), e.g., in addition to a CCC and/or cathode including exsolute oxide. The thin layer may be formed of material configured to capture Cr, such as MgO on top of LSM CCC layer. For example, to capture Cr, vapor phase Cr may interact with MgO layer to form MgCr2O4 spinel phase. In such a case, less Cr will be deposited at cathode interface. The Cr capture material or "Cr gettering material" is not limited to MgO. For example, it may be other transition metal alkaline earth oxide, such as SrO, Ca, BaO, rare earth metal oxide, such as $La_2O_3$, $Y_2O_3$, $CeO_2$, PrOx, and NdOx, and perovskite, such as LNF, or other suitable materials. The cathode materials can be selected from perovskite materials such as doped lanthanum manganite, doped lanthanum cobaltite, doped lanthanum ferrite.

EXAMPLES

Various experiments were carried out to evaluate one or more aspects of example anode compositions in accordance with the disclosure. Four different LSM-based cathodes were tested in Cr sourced pressurized testing rig to evaluate Cr poisoning effect on cathode performance and degradation. After over 4,000 thousands hours testing, Cr content and distribution in each cathode and cathode current collecting (CCC) layer were examined through WDS quantification analysis. FIG. 3 is a chart illustrating the results. The results indicate Cr species were significantly trapped in CCC layer and the amount was highly depending on LSM non-stoichiometry. Thermal dynamic stable (Cr,Mn)3O4 spinel formed by Cr vapor species reacting with free MnOx in LSM CCC was observed in TEM analysis.

Various embodiments of the invention have been described. These and other embodiments are within the scope of the following claims.

The invention claimed is:

1. A fuel cell system comprising:
a cathode;
a cathode conductor layer adjacent the cathode and positioned between the cathode and an oxidant gas stream, the cathode conductor layer including an additional material other than that of the exsolute oxide that is configured to capture the Cr vapor species present in the fuel cell system, the cathode conductor layer having a first region and a second region;
an electrolyte separated from the cathode conductor layer by the cathode;
an anode separated from the cathode by the electrolyte;
at least one interconnect in the electrolyte contacted by at least a portion of the second region; and
an additional layer deposited on an outer surface of the cathode conductor layer to capture the Cr vapor species present in the fuel cell system, and wherein the additional layer does not provide any required electronic conductance functionality to the fuel cell,
wherein the anode, cathode conductor layer, cathode, and electrolyte are configured to form an electrochemical cell,
wherein an exsolute oxide is present in the cathode and the first and second regions of the cathode conductor layer, and the exsolute oxide reacts with Cr vapor species present in the oxidant gas stream to capture the Cr vapor species, and
wherein the cathode conductor layer includes more exsolute oxide than the cathode.

2. The fuel cell system of claim 1, wherein the cathode conductor layer is formed from an LSM material having A-site deficiencies, wherein the exsolute oxide in the cathode conductor layer comprises a manganese oxide exsolution resulting from equilibrium concentration of the LSM while the fuel cell operates.

3. The fuel cell system of claim 1, wherein the exsolute oxide comprises a manganese oxide.

4. The fuel cell system of claim 1, wherein the additional material comprises an alkaline earth oxide.

5. The fuel cell system of claim 1, wherein the cathode conductor layer functions as a primary conduction path and to capture the Cr vapor species present in the fuel cell system.

6. The fuel cell system of claim 1, wherein the cathode functions as a reduction catalyst and to capture the Cr vapor species present in the fuel cell system.

7. The fuel cell system of claim 1, wherein the additional layer comprises at least one of an alkaline earth metal oxide, transition metal oxide, or rare earth metal oxide which reacts with the Cr vapor species to capture the Cr vapor species in the additional layer.

8. A method comprising forming a fuel cell system, the fuel cell system comprising:
a cathode;
a cathode conductor layer adjacent the cathode and positioned between the cathode and an oxidant gas stream, the cathode conductor layer including an additional material other than that of the exsolute oxide that is configured to capture the Cr vapor species present in the fuel cell system, the cathode conductor having a first region and a second region;
an electrolyte separated from the cathode conductor layer by the cathode;
an anode separated from the cathode by the electrolyte;
at least one interconnect in the electrolyte contacted by at least a portion of the second region; and
an additional layer deposited on an outer surface of the cathode conductor layer to capture the Cr vapor species present in the fuel cell system, and wherein the additional layer does not provide any required electronic conductance functionality to the fuel cell,
wherein the anode, cathode conductor layer, cathode, and electrolyte are configured to form an electrochemical cell,
wherein an exsolute oxide is present in the cathode and the first and second regions of the cathode conductor layer, and the exsolute oxide reacts with Cr vapor species present in the oxidant gas stream to capture the Cr vapor species, and wherein the cathode conductor layer includes more exsolute oxide than the cathode.

9. The method of claim 8, wherein the cathode conductor layer is formed from an LSM material having A-site deficiencies, wherein the exsolute oxide in the cathode conductor layer comprises a manganese oxide exsolution resulting from equilibrium concentration of the LSM while the fuel cell operates.

10. The method of claim 8, wherein the exsolute oxide comprises an alkaline earth oxide.

11. The method of claim 8, wherein the additional material comprises an alkaline earth oxide.

12. The method of claim 8, wherein the cathode conductor layer functions as a primary conduction path and to capture the Cr vapor species present in the fuel cell system.

13. The method of claim 8, wherein the cathode functions as a reduction catalyst and to capture the Cr vapor species present in the fuel cell system.

14. The method of claim 8, wherein the additional layer comprises at least one of an alkaline earth metal oxide, transition metal oxide, or rare earth metal oxide which reacts with the Cr vapor species to capture the Cr vapor species in the additional layer.

* * * * *